(12) United States Patent
Loccisano

(10) Patent No.: US 12,533,950 B1
(45) Date of Patent: Jan. 27, 2026

(54) APPARATUS AND METHOD FOR A VIRTUAL VISUAL EXPERIENCE IN ELECTRIC VEHICLES

(71) Applicant: Vincent Loccisano, Wellesley, MA (US)

(72) Inventor: Vincent Loccisano, Wellesley, MA (US)

( * ) Notice: Subject to any disclaimer, the term of this patent is extended or adjusted under 35 U.S.C. 154(b) by 4 days.

(21) Appl. No.: 18/783,635

(22) Filed: Jul. 25, 2024

(51) Int. Cl.
*B60K 35/21* (2024.01)
*G06T 13/20* (2011.01)

(52) U.S. Cl.
CPC .............. *B60K 35/21* (2024.01); *G06T 13/20* (2013.01)

(58) Field of Classification Search
CPC ...... B60L 53/80; B60L 2200/40; B60L 50/64; A01B 69/008; Y02T 10/7072
See application file for complete search history.

(56) References Cited

U.S. PATENT DOCUMENTS

2023/0322094 A1\* 10/2023 van Nus ................. B60L 15/20
701/22

\* cited by examiner

*Primary Examiner* — Rodney A Butler

(57) ABSTRACT

A method and apparatus enables modifying the electronic controls of EVs to mimic the sensory experience of driving a performance ICE car. The method and apparatus creates a sensory "virtual cockpit" with both electronic and mechanical enhancements for a sensory experience. By downloading and implementing the method and apparatus, one may replicate, for example, the various gauges of an ICE vehicle to mimic the visual experience of driving various ICE classic cars. In another embodiment, a 3D-rendered image of the exterior of an ICE performance vehicle is displayed on LCD surface on electric vehicle body panels.

6 Claims, 3 Drawing Sheets

100

100

APPARATUS AND METHOD FOR A VIRTUAL VISUAL EXPERIENCE IN ELECTRIC VEHICLES

TECHNICAL FIELD

This apparatus and method relates to methods, circuits, or devices for controlling the information or communication technologies involved in the operation of electric vehicles; arrangements of instruments for and aspects of display of information in a vehicle; non-manual adjustments, e.g. with electrical operation with logic circuits and with logic circuits using sensors or detectors for adapting the control systems.

BACKGROUND OF THE INVENTION

While electric vehicles (EVs) and hybrid vehicles offer environmental benefits by reducing greenhouse-gas emissions and air pollution, some drivers find the driving experience to be unsatisfactory because there is little sensory feedback of the kind they are used to in traditional internal-combustion-engine (ICE) vehicles. Some consumers express a preference for the sound and vibration associated with traditional internal-combustion-engine (ICE) vehicles, whether out of nostalgia, a perception of a more engaging driving experience, or lack of feedback about vehicle performance in EVs.

Automobile electronics, including computers, electrical cables, and software protocols, are together known as a Controller-Area Network (CAN), or CAN bus. A CAN is a vehicle's main computer system. Through the CAN bus, data travels through the system to the many subsystems such as those controlling the engine, the transmission, doors, windows, and other subsystems. Each of these subsystems is controlled by an electronic control unit (ECU). Current EVs may have fifty or more ECUs, each able to sense signals indicating, for example: acceleration at various angles; voltage; pressure; braking; vehicle roll and yaw; steering angle; temperature, and other variables. The CANbus routes signals from sensors to computers as communicated by each ECU. An ECU can monitor voltage used by a subsystem and communicate that information through the CANbus to actuate, for instance, stopping a power-sliding door from closing on a passenger's limb, or adjusting a fuel injector's performance.

Adding to or changing a vehicle's electronic features once required extensive wiring. With the development of CAN in the last forty years, feature development (such as adding passenger-controlled climate options) has become physically easier because each new feature can now be added by programming the new computer code into the CAN. Now, all vehicle features as well as vehicle diagnostics are controlled via CAN, which uses a standardized protocol called OBD-II. New features can be integrated into an EV by developing and uploading an algorithm into the vehicle's CAN.

Vehicle computer networks are now evolving to work with other network protocols, including Local Interconnect Networks (LIN) and FlexRay, which are network protocols designed for vehicles, as well as Ethernet.

Modern and future EVs will soon enable finely tunable driver electronic inputs. Accelerators and brakes will no longer be physically connected to the corresponding systems of the vehicle; instead, they will be electronic inputs controlled by a computer and ultimately delivered to the wheels. Modern EVs also require no physical gear-changing because these vehicles don't need a clutch or a manual transmission. Additionally, steering will be electronically rather than mechanically directed. For example, the Tesla Cyber Truck is the first mass-produced EV in which the steering wheel is a steer-by-wire system that is not rigidly connected to the turning wheels of the vehicle.

Patents and products in the current state of the EV art mimic some of the performance characteristics and visual effects of internal-combustion cars. Controls and customizability of the experience are limited and may not be feasible for all vehicle makes and models.

A Heads-Up Display (HUD) is a transparent image projected onto a windshield of a vehicle that presents data without requiring a driver to look away from the road. The origin of the name HUD stems from its earliest application in aircraft where a transparent display in front of the wind screen enabled easier view. A HUD obviates the necessity of refocusing between the landscape and the near surface of the interior dashboard.

Holography is a technique that enables a wavefront to be recorded and later reconstructed. A hologram is a recording of an interference pattern that can reproduce a 3D light field using diffraction. Liquid Crystal Displays (LCD) are electronically modulated optical devices that use light-modulating properties of liquid crystals combined with polarizers.

All of these subsystems will be electronically operated through a central control that can be modified by a driver, but the loss of the general feel may disappoint driving enthusiasts, who may come to view their EV as an appliance rather than a car.

A customizable and adaptable system that enables driver-dictated virtual controls would offer a responsive, sensory experience like that of performance cars.

SUMMARY OF THE INVENTION

A method and apparatus enables modifying the electronic controls of EVs to mimic the visual experience of driving a performance ICE car. The method and apparatus creates a sensory "virtual cockpit" with both electronic and mechanical enhancements for a sensory experience. By downloading and implementing the method and apparatus, one may replicate the audio/visual cues of a performance ICE via a graphical user interface. These simulations replicate the various gauges of an ICE vehicle to mimic the experience of driving an ICE performance car.

In an embodiment, virtual indicators such as gauges may be displayed as a HUD on a vehicle's windscreen, replicating the HUD graphics seen in modern ICE vehicles.

In a separate embodiment, indicators appear in a holographic display, in which a driver may interact with the holographic rendering to actuate ICE-mapped features.

The method and apparatus's algorithm may be downloaded into any of an EV's ECUs, CAN, LIN, or Ethernet platform to simulate aspects of an ICE. The method and apparatus creates a virtual cockpit that replicates that of ICE vehicles. A vehicle manufacturer maps its factory-supported, brand-specific system commands to the algorithms of the method and apparatus to render the EV into an immersive ICE simulation that is layered over EV technology. For example, a driver interested in replicating the experience of driving a 1960s Jaguar would use the method and apparatus to alter the factory-provided CAN to simulate that experience, with driver inputs mapped to existing controls that output those replicating that model. Specifically, for example, the driver might experience the dashboard of a 1960's Jaguar in the form of digital images of gauges and dials as they looked in the performance vehicle.

The method and apparatus's algorithm may be downloaded into any of an EV's ECUs, CAN, LIN, or Ethernet platform to simulate aspects of an ICE. The method and apparatus creates a virtual cockpit that simulates a particular ICE vehicle, toggling between EV and ICE experience.

In one embodiment, a vehicle manufacturer maps its factory-supported, brand-specific system commands to the algorithms of the method and apparatus to render the EV an immersive ICE simulation that is layered over EV technology. System commands are actions, features and functions controlled and rendered by dashboard indicators and actuators. Indicators include gauges such as a gas gauge, speedometer, tachometer and the like. Actuators include switches, levers and buttons such as light switches, temperature and vent control levers and buttons that include a starter button, radio knobs and the like. For example, a driver interested in replicating the experience of driving a 1960s Jaguar might choose to purchase the manufacturer's modified system commands specific to a 1960s Jaguar, or might choose to use the method and apparatus to alter the factory-provided ECU and CAN to simulate that experience.

In a separate iteration, a driver may choose an aftermarket, downloadable "vehicle pack" or modification set that employs the apparatus and method to make the modifications. Here an EV driver has additional control over each input.

In yet another iteration, an EV's exterior is overlaid with an image of a performance ICE car. The image is rendered by rear projection to an LCD coating on the EV's exterior body panels, with the effect of rendering the vehicle's exterior to that of a different car.

The apparatus and method reconfigures aspects of an ICE performance vehicle, enabling driver inputs through a touchscreen on the dashboard or anywhere near the driver's seat. On the touchscreen, a driver may choose ICE performance-vehicle aspects and characteristics to apply. Driver inputs are mapped to existing controls that output those replicating a vehicle model of choice.

In one embodiment, aspects of an ICE performance vehicle are represented by 3D, computer-generated animations that appear as ICE performance-vehicle indicators and actuators. Animations of characteristic changes are reflected in the indicators. For example, actual acceleration generates a 3D animation of a speedometer with a moving needle.

Temperature controls are set similarly, with an ICE vehicle's temperature-adjustment lever replicated in 3D animation with haptic controls that a driver touches to move the 3D-animated lever. Driver inputs are sent by software commands to the EV ECU, which directs the CAN to change the temperature accordingly.

Embodiments mimic the effects of various vehicles. For example, an embodiment creates a virtual visual experience of driving a performance ICE. Modern EVs commonly have large digital touch screens that are used in place of actual gauges, with these screens displaying colored dials on tachometers, speedometers and other gauges, as well as sliding or rotating HVAC controls, switches, indicator lights and the like. This embodiment enables the large electronic screen to mimic that of various classic ICE cars, with their specific controls displayed in 3D digital animation directly on the screen. The apparatus and method enables user customization; for example, one may choose from a set of custom dashboards enabling a choice of gauges in a chosen gauge cluster.

Many modern EVs have a built in Heads-Up-Displays (HUDs) to project information on the windshield in a transparent format, allowing the driver to see the road while reading messages about dashboard information, or a notice of a phone call.

In one embodiment, a HUD may project a preferred driving line over the driver's view of the road. A furred line through a turn is projected on a HUD to illustrate where to brake or where to accelerate, all creating a performance-car virtuality while operating safely. When used on an established professional racing track or circuit, the driving lines may be predetermined based on the chosen ICE experience and existing track data. In another example, when driving on a public road, information gathered from a standard EV forward-facing camera, combined with GPS location data, are together used to generate a furred line on a HUD in real time.

The resulting manual driving experience may mimic that of a simulation racing video game while operating under the safety of an electric vehicle's limits. This embodiment may also use holographic gauges for an immersive cockpit effect.

DETAILED DESCRIPTION OF THE INVENTION

Figure 1:
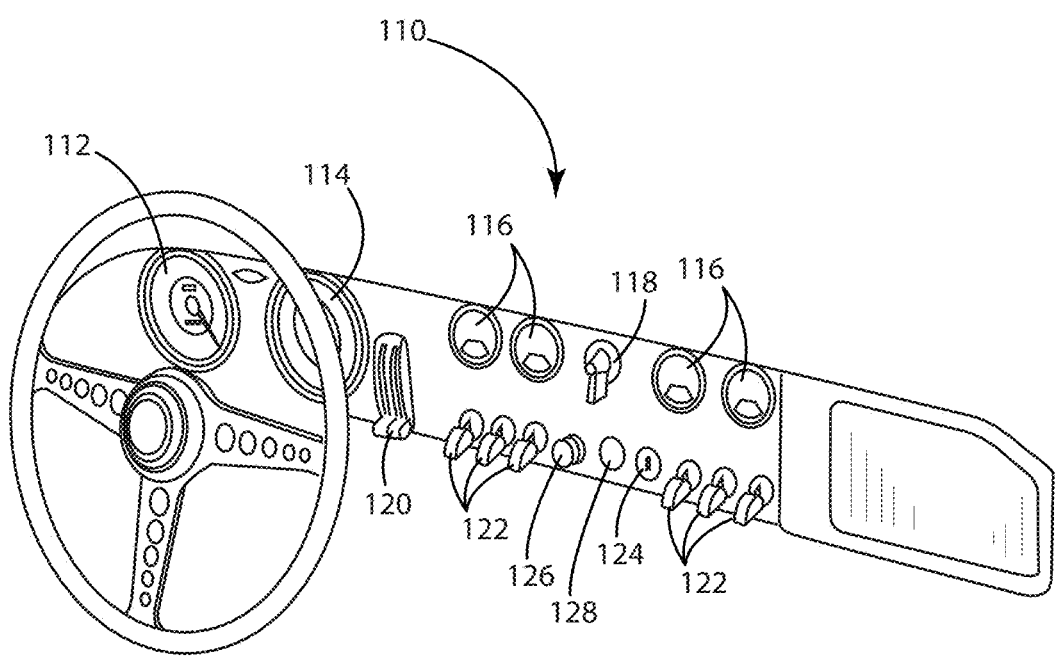
FIG. 1 is a perspective view of a performance ICE vehicle dashboard.

FIG. 1 is a perspective view of an example performance ICE vehicle dashboard 110. This example depicts that of a 1967 Jaguar E-Type roadster. A speedometer 112 is a relatively large, circular, analog dial with a radial pointer indicating speed and an analog mileage counter and trip mileage counter in the center of the dial. A tachometer 114 is of a similar diameter and is also an analog gauge indicating transmission revolutions per minute (RPM). A sliding lever 120 controls the temperature inside the vehicle by adjusting vents and/or engaging an air conditioner. Analong gauges 116 are connected to various sensors that indicate water, oil, fuel, and battery levels. Toggle switches 122 control various features, including windshield-washer fluid spray, interior lights, heating ventilation and cooling-fan speed. An analog dial 118 engages and adjusts headlights and light intensity. Other features on this dashboard include a keyed switch 124 that locks the starter button 126 and a 12V receptacle 128.

Figure 2:
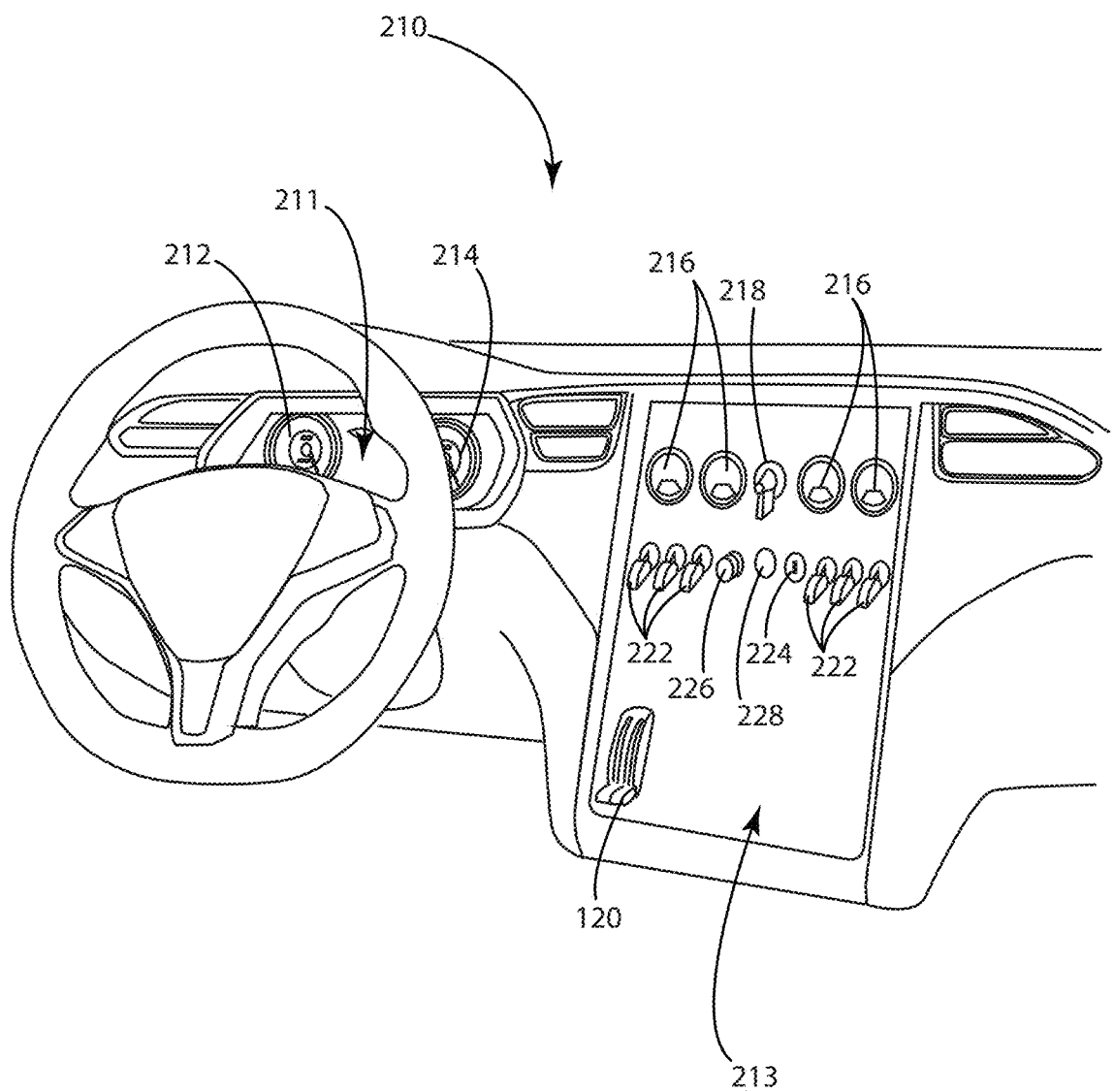
FIG. 2 is a perspective view of images of gauges and switches from the performance ICE vehicle dashboard of FIG. 1 on the touch screen and digital screen of an EV.

FIG. 2 is a perspective view of an example embodiment 200 of a method and apparatus illustrating some of the features, gauges and switches on an electric-vehicle dashboard 210. The electric-vehicle dashboard 210 includes a digital screen 211 that illustrates various digital gauges indicating speed, energy level, outside temperature, mileage and the like. In one embodiment the digital screen 211 illustrates a 3D visual replica of a speedometer 212 that, similar to the speedometer 112 (FIG. 1) is a relatively large, circular, analog dial with a radial pointer indicating speed, and an analog mileage counter and trip mileage counter in the center of the dial. As in the dashboard 110 (FIG. 1) a tachometer 214 is of a similar diameter to the speedometer 212 and is also a 3D model similar in appearance to the tachometer 114. In this embodiment the tachometer indicates the revolutions per minute (RPM) of the EV motor. In some embodiments the tachometer indicates the RPM that an ICE transmission would generate at a given speed, assuming gear-shifting were done appropriately. One skilled in the art understands that a sound system may be configured to approximate the sound of an ICE transmission shifting through gears at various speeds.

A touch screen 213 is common to many EVs. An EV touch screen usually illustrates buttons and slider bars that enable users to control the vehicle interior climate, music, navigation, and other aspects. The touch screen projects realistic 3D renderings of ICE performance-type analog gauges. Such gauges 116 may indicate, for example, water, oil, fuel, and battery levels, labeling from left to right. In some embodiments, gauges 216 may indicate energy level, efficiency, miles remaining at current driving speed, and the like. A 3D-digital rendering of the headlight control 218 may be operated by sliding a finger over the control to move the animation to control the EV headlights. In some embodiments, 3D renderings of analog switches 222 may act as slider bars to control windshield-washer fluid spray, interior lights, heating, ventilation and cooling-fan speeds and the like, as well as a 3D animation of analog levers 220, which function as slider bars to control the EV interior temperature. In this example embodiment the keyed switch 224 and the starter button 228 may function together to start the EV. One skilled in the art understands that these may be configured to function only when a key fob is in proximity of the vehicle. One skilled in the art understands that the 12V input 226 may be reconfigured for another useful purpose such as turning on a dome light.

Figure 3:
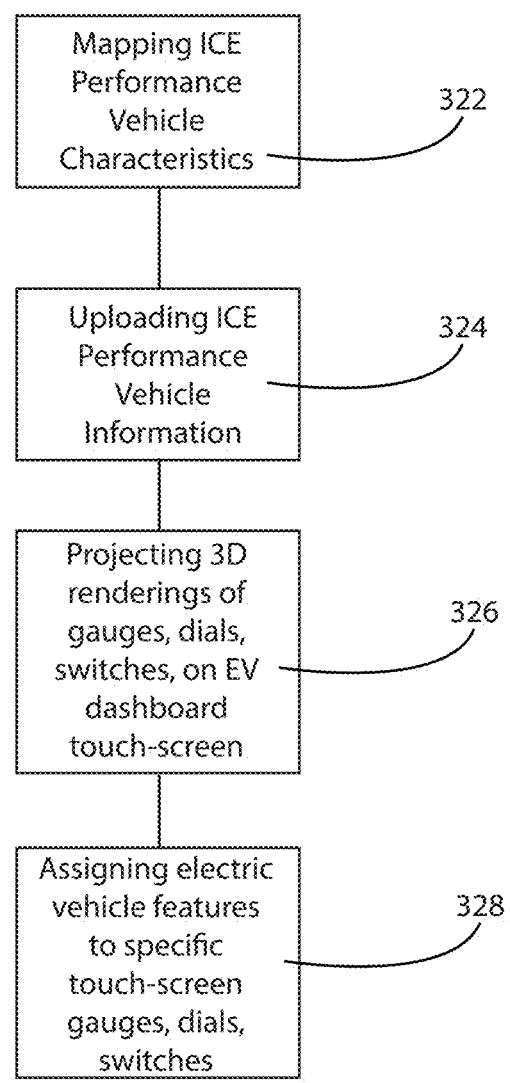
FIG. 3 is a flowchart of a method of the disclosure.

FIG. 3 is a flowchart of a method of the disclosure. In an example method of the embodiment, the method maps ICE-performance vehicle characteristics 322 to user inputs. Recorded aspects of the ICE-performance vehicle come embedded in the software. Uploading ICE performance-vehicle information 324 provides the EV CAN with the 3D graphics that simulate the dashboard features and functions of an ICE performance vehicle. Projecting 3D renderings of gauges, dials, switches and the like on an EV dashboard touch screen 326 provides the user with the look and feel of the ICE performance vehicle environment. Assigning electric vehicle features to specific touch screen illustrations of gauges, dials, switches 328 and the like provides the user the ability to still control the necessary features and to read the necessary gauges while experiencing the look and feel of an ICE performance vehicle.

In another embodiment LCD surfaces are adhered to the body panels of the EV. 3D rendered images of an ICE performance vehicle are displayed on the LCD surfaces wherein each ICE performance vehicle body panel is displayed on the corresponding EV body panel to provide an exterior visual experience of driving an ICE performance vehicle.

The invention claimed is:

1. A method for creating a visual ICE-performance-vehicle-experience in an EV, the method comprising:
mapping ICE-performance-vehicle characteristics relating to dashboard indicators and actuators; and
creating computer-generated, 3D-rendered animations of said dashboard indicators and actuators; and
uploading ICE-performance-vehicle characteristics relating to dashboard indicators and actuators and said 3D-rendered animations thereof to an EV electronic control unit; and
displaying said 3D-rendered animations on said EV interior screens; and
assigning actions to 3D-rendered animations to EV characteristics relating to dashboard indicators and actuators; and
engaging said 3D-rendered animations on a heads-up display configured to perform functions of said indicators and actuators; wherein
engaging said 3D-rendered animations on said EV screens performs functions of said indicators and actuators.

2. The method of claim 1 wherein:
the ICE-performance-vehicle characteristics relating to dashboard indicators and actuators are derived from a specific ICE vehicle make, model and year.

3. The method of claim 1 wherein:
the ICE-performance-vehicle characteristics relating to dashboard indicators and actuators are chosen by the user from a collection of ICE performance vehicles.

4. The method of claim 3 wherein:
dashboard indicators chosen by the user may be assigned electric-vehicle functions by the user.

5. A method for creating a visual ICE performance vehicle experience in an EV, the method comprising:
mapping ICE performance-vehicle dashboard and characteristics relating to dashboard indicators and actuators; and
creating computer-generated, 3D-rendered animations of said dashboard, including said indicators and actuators; and
uploading ICE-performance-vehicle characteristics relating to dashboard indicators and actuators and said 3D-rendered animations thereof to an EV electronic-control unit; and
providing a holographic generator; and
displaying said 3D-rendered animations through said holographic generator proximal to said EV interior screens; and
assigning actions to 3D-rendered animations to EV characteristics relating to dashboard indicators and actuators; wherein
engaging said 3D-rendered, holographic animations proximal to said EV screens performs functions of said indicators and actuators.

6. A method for creating a visual ICE performance vehicle experience in an EV, the method comprising:
mapping ICE performance-vehicle exterior image of each ICE performance vehicle body panel; and
creating computer-generated, 3D-rendered images of each of said body panel; and
uploading computer-generated, 3D-rendered images to an EV electronic control unit; and
providing LCD surfaces on each electric vehicle body panel; and
displaying said 3D-rendered images to each corresponding electric vehicle body panel;
wherein
an image of an ICE performance vehicle is projected over the exterior surface of the electric vehicle.

* * * * *